April 7, 1970   P. C. GOLDMARK ET AL   3,504,445
AUDIO-VISUAL APPARATUS

Filed April 13, 1967   6 Sheets-Sheet 1

INVENTORS
PETER C. GOLDMARK,
ARTHUR KAISER,
BY  BENJAMIN B. BAUER &
WARREN C. PORTMAN

Brumbaugh, Free, Graves & Donohue their   ATTORNEYS

April 7, 1970   P. C. GOLDMARK ET AL   3,504,445
AUDIO-VISUAL APPARATUS

Filed April 13, 1967   6 Sheets-Sheet 3

INVENTORS
PETER C. GOLDMARK,
ARTHUR KAISER,
BENJAMIN B. BAUER &
WARREN C. PORTMAN
BY Brumbaugh, Free, Graves & Donohue
their ATTORNEYS

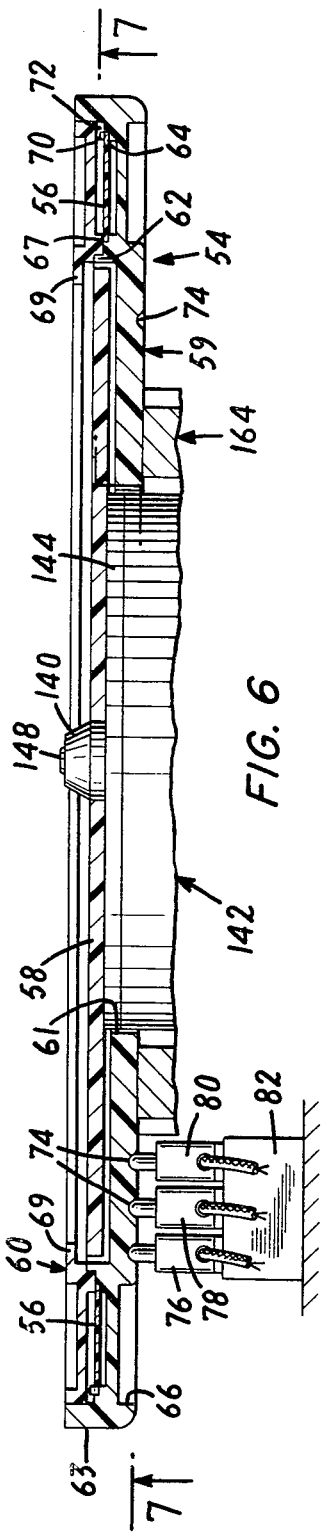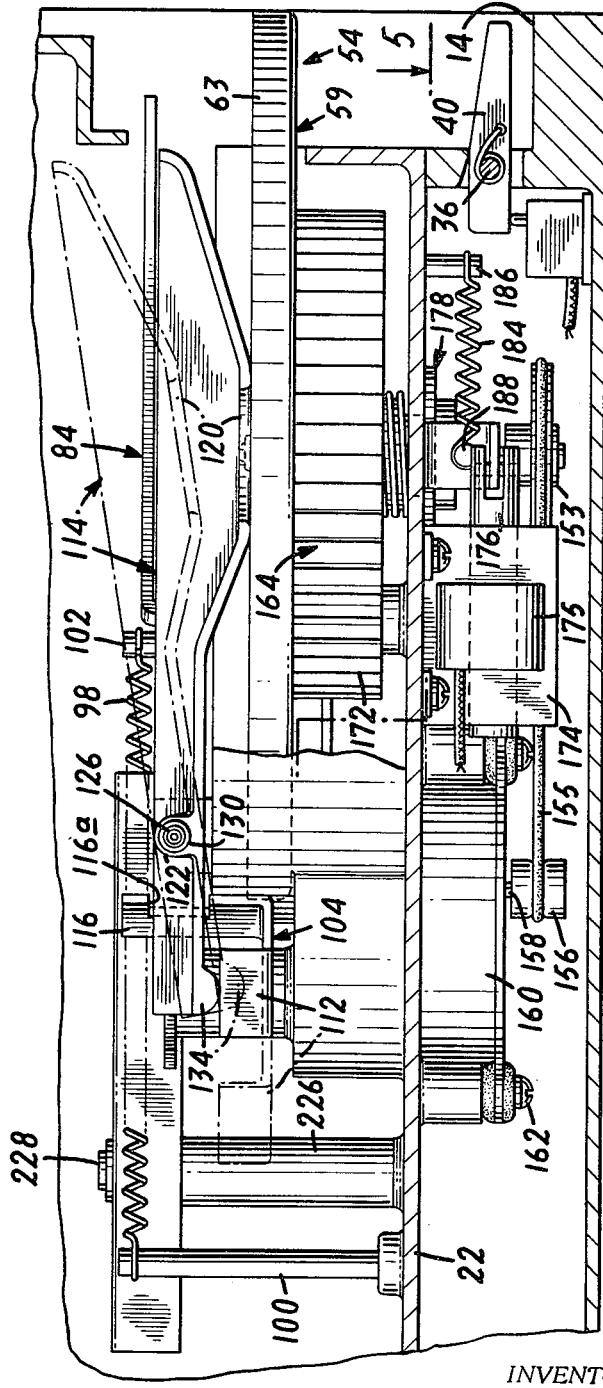

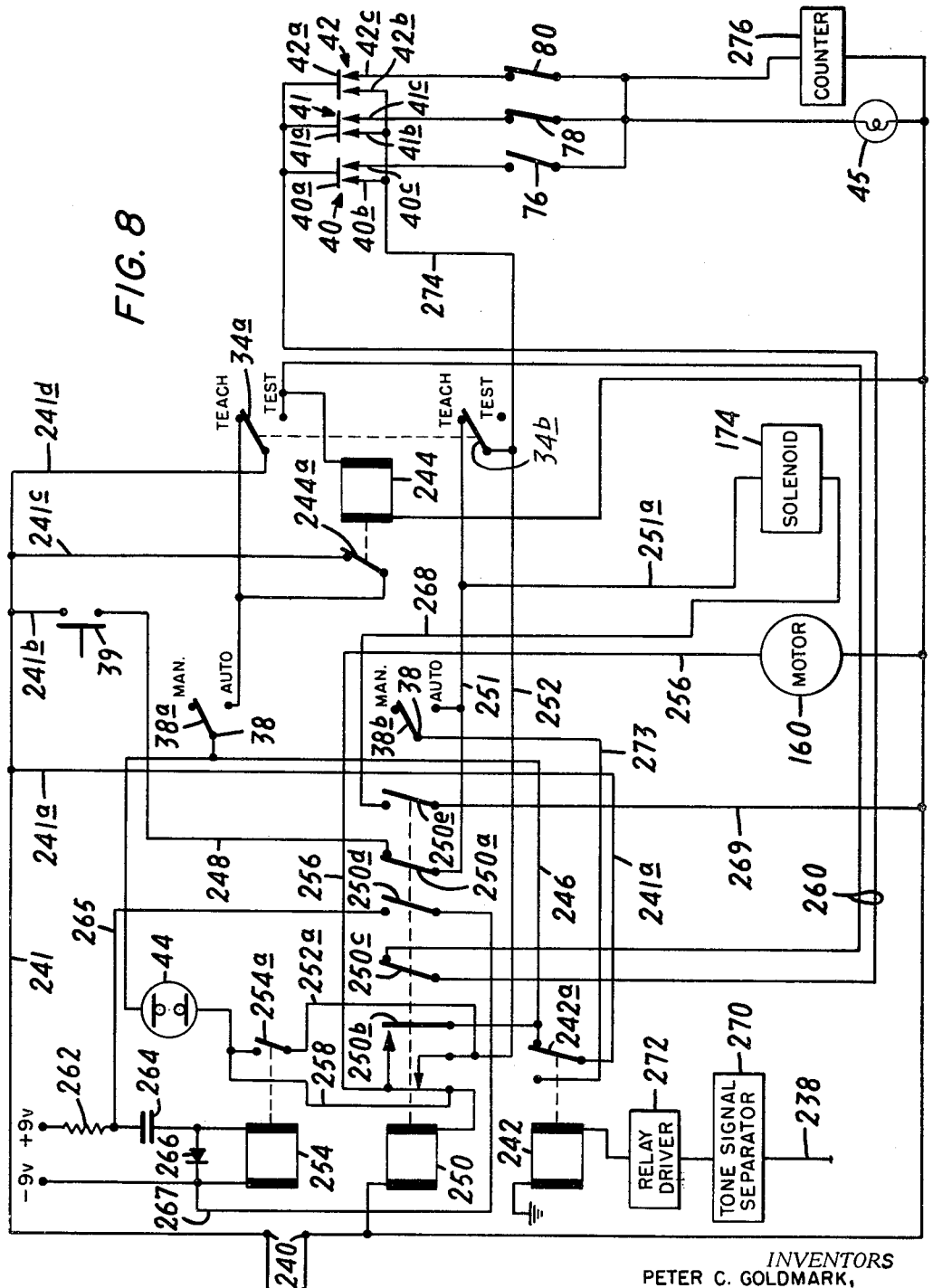

United States Patent Office 3,504,445
Patented Apr. 7, 1970

3,504,445
AUDIO-VISUAL APPARATUS
Peter C. Goldmark, Stamford, Arthur Kaiser, Trumbull, and Benjamin B. Bauer, Stamford, Conn., and Warren C. Portman, Mahopac, N.Y., assignors to Columbia Broadcasting System, Inc., New York, N.Y., a corporation of New York
Filed Apr. 13, 1967, Ser. No. 630,762
Int. Cl. G09b 7/08
U.S. Cl. 35—9                                   23 Claims

ABSTRACT OF THE DISCLOSURE

In the described embodiment of the invention, an audio-visual apparatus is provided which has a teaching mode of operation and a testing mode of operation and utilizes a combination cartridge containing circumferential series of transparencies and a central captive record disc. In the teaching mode, the transparencies are selectively projected onto a screen to the accompaniment of audio description reproduced from the record disc and in the test mode of operation, each projected transparency and the accompanying audio information reproduced from the record disc comprises a test question which is answerable as a three element multiple choice. The captive record disc is carried by a motor driven turntable and the transparencies are carried by and secured to a ratchet which is incrementally rotated by a solenoid actuated lever arm. For terminating the reproduction of audio information relating to a selected projected slide, the record disc has recorded thereon sub-audible tone signals separating the segments of audio information corresponding to different transparencies. The transparent disc also includes selectively spaced depressions formed in its lower edge, each depression being aligned with a transparency and corresponding to a correct answer to the question presented to a pupil concerning the transparency.

BACKGROUND OF THE INVENTION

This invention relates to audio-viausl reproduction devices and, more particularly, to an improved audio-visual teach and test device which coordinates the projection of individual picture transparencies with the reproduction of corresponding sound information from a grooved record disc.

The advantages of audio-visual reproduction devices for entertainment, commercial and educational purposes are numerous, and such devices are being marketed at an ever increasing rate. This is particularly true in the field of education wherein the audio-visual devices are employed to facilitate the teaching and testing of individual students. A disadvantage with many such devices lies in the fact that, because of their bulkiness and complexity, they are quite expensive and require the services of a skilled technician for their operation and the changing of program material therefor. Another disadvantage is that many of these devices are not self contained and do not accept answers to questions relating to a projected slide. Instead, the student must write his answer on an answer sheet for subsequent marking by the teacher. Still other prior art devices are not foolproof and permit tampering with the results after the student has completed the test.

SUMMARY OF THE INVENTION

Accordingly, it is an object of the present invention to provide an audio-visual device which overcomes the above-mentioned disadvantages of the prior art.

It is another object of the present invention to provide a self-contained and compact audio-visual device for teaching and testing of individual students without the need for a skilled individual in attendance.

It is a further object of the present invention to provide a fully automatic audio-visual teaching and testing device having several modes of operation whereby students may be tested or trained in accordance with a preselected and changeable program.

These and other objects of the invention are accomplished by providing an audio-visual device for projecting spaced visual information segments carried by a holder and for reproducing sound information recorded on a storage medium held captive by the holder which comprises a housing for receiving the holder. To project the spaced visual information segments carried by the holder, the audio-visual housing includes an optical projecting system and, to align successive information segments with the optical projection system, a drive mechanism is provided to support and selectively advance the holder. Also provided are a storage medium drive mechanism which supports the storage medium and selectively moves the storage medium independently of the holder and a sound reproducing transducer for operative engagement with the storage medium and for reproducing the recorded information therefrom when the storage medium is moved by the storage medium drive mechanism. The device further includes control apparatus responsive to the information reproduced from the storage medium for controlling the actuation of the holder and storage medium drive mechanisms.

In a preferred embodiment of the invention an audio-visual teach and test device is provided which has a teaching mode of operation wherein a series of transparencies circumferentially spaced on a transparent disc are selectively projected onto a screen to the accompaniment of audio information reproduced from a grooved record disc held captive by the transparent disc and a test mode of operation wherein each slide and the accompanying audio information reproduced from the record disc comprises a test question which is answerable as a three element multiple choice. A captive grooved record disc is carried by a motor driven turntable and the transparent disc is carried by and secured to a ratchet which is incrementally rotated by a solenoid actuated lever arm. For terminating the reproduction of audio-information relating to a projected slide, the record disc has recorded thereon inaudible tone signals which separate the segments of information corresponding to different transparencies. The transparent disc further includes selectively spaced depressions formed in its lower edge, each depression being aligned with a transparency and corresponding to a correct answer to the question posed to the pupil concerning the transparency.

BRIEF DESCRIPTION OF THE DRAWING

In the drawings:

FIGURE 4 is a sectional end view of the audio-visual device taken along the line 4—4 of FIGURE 2;

FIGURE 6 is an enlarged sectional view of the cartridge employed in the audio-visual device and arranged according to the present invention;

FIGURE 7 is a bottom view of the cartridge, partly broken away, taken along the line 7—7 of FIGURE 6 and looking in the direction of the arrows;

FIGURE 7A is an enlarged fragmentary view showing a portion of the cartridge enclosed by the circle 7A in FIGURE 7; and FIGURE 8 is a schematic circuit diagram of the control electronics of the audio-visual device arranged according to the present invention.

DESCRIPTION OF THE PREFERRED EMBODIMENT

Figure 1:
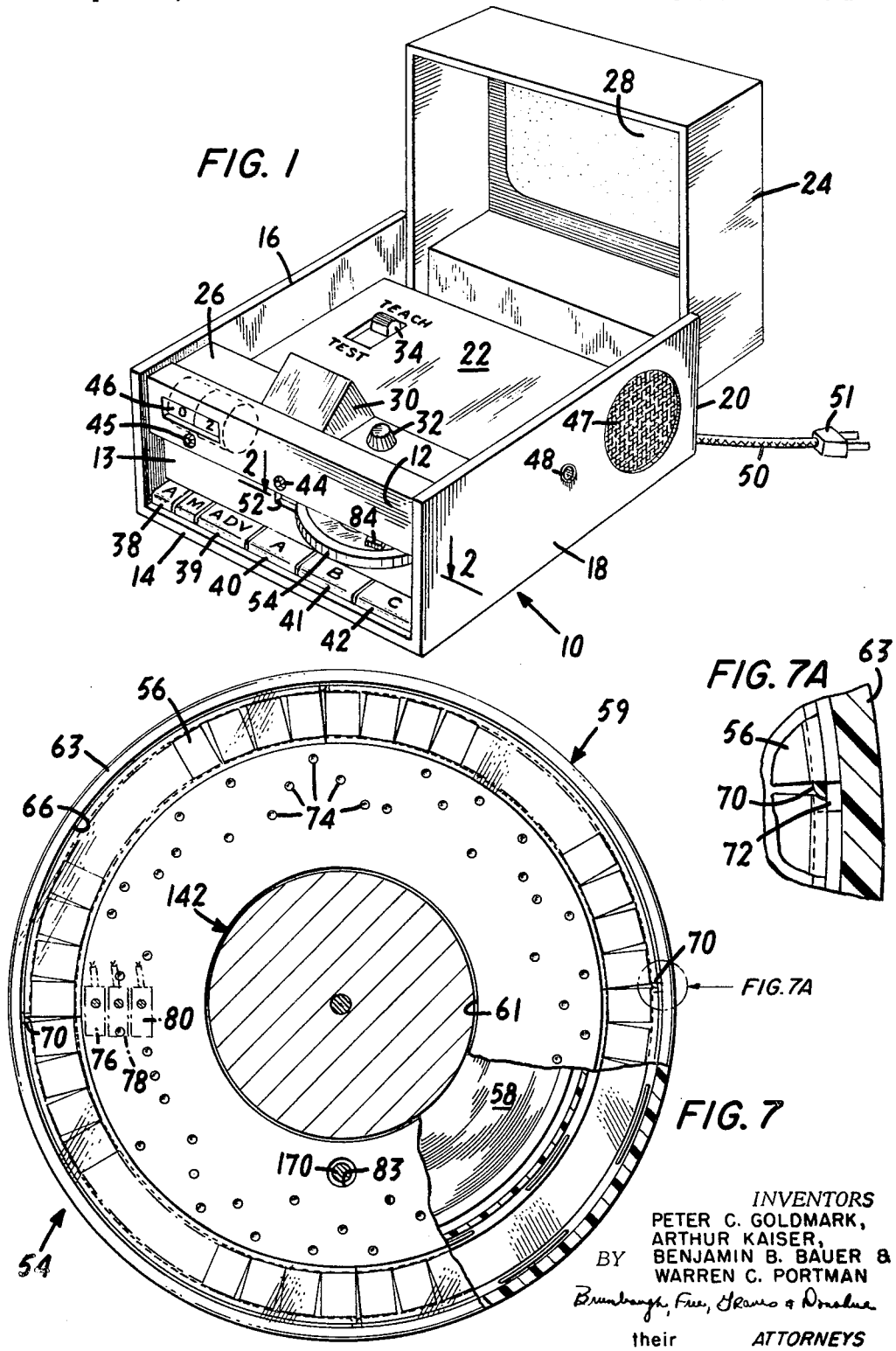
FIGURE 1 is a perspective view of an illustrative audio-visual device arranged according to the present invention.

In the illustrative embodiment of an audio-visual teach and test machine arranged according to the present invention, as shown in FIGURE 1, a casing 10 is provided which includes a front wall 12 having a recessed lower portion 13, a bottom wall 14, side walls 16 and 18 and a back wall 20. Also included are a support plate 22 which extends rearwardly above the bottom wall 14 from the recessed lower portion 13 of the front wall 12 to the back wall of the casing 10 and a cover plate 24, shown in its upright position, which is hinge mounted to the back wall 20 of the casing. When closed, the cover plate 24 fits in the area defined by the side walls 16 and 18, the support plate 22 and an upper support plate 26 secured to the front wall 12 and similarly extending between the side walls 16 and 18. The cover plate may be secured in its closed position and, correspondingly, opened to its upright position in any conventional manner, as is understood in the art.

Mounted inside the cover plate 24 is a front projection screen 28, preferably formed of sheet aluminum. In the preferred embodiment of the invention, the sheet aluminum screen is sanded in a vertical direction to produce thereby a plurality of extremely narrow, closely spaced grooves in the screen and then additionally treated, as by vapor blasting, to remove substantially all the specular light reflection therefrom. The narrow grooves formed in the screen, which traverse the entire surface of the screen in the vertical direction, operate to spread incident light in a horizontal arc without substantially affecting the reflection of the incident light over the vertical arc.

Secured to the support member 26 is a lens cover 30 which, as will be explained in detail hereinbelow, protects a reflecting mirror of the optical projecting system of the present invention. A knurled knob 32 is similarly mounted on this member 26 adjacent the lens cover for controlling the focusing of images onto the projection screen 28. As will be explained in detail hereinbelow, the lens projecting system comprises a telescopically adjustable lens barrel whose vertical movement is controlled by the knurled knob 32. To focus the projected images, the knob 32 is rotated either clockwise or counter-clockwise until the projected images are reproduced with clarity and distinction. Mounted in the support plate 22 is a manually operable teach and test switch 34 which includes an actuating member slidable between a "test" position and a "teach" position. This switch controls the mode of operation to be implemented by the device 10, as will be explained in detail hereinafter. For the sake of simplicity, the switch 34 is shown such that it is readily accessible to the operator of the device. In a preferred embodiment of the device, however, the switch 34 is situated within a sliding panel which can be opened only with a properly keyed tool. This tool is entrusted to a teacher or some other authorized person who is responsible for determining the mode of operation to be implemented by the device 10.

Mounted on a pin member 36 (FIG. 4) extending across the face of the device 10 and interposed between the recessed portion 13 of the front wall and the base wall of the device is a series of switches 38, 39, 40, 41 and 42 for controlling Automatic-Manual, Advance and multiple choice answer selections A, B and C, respectively, as shown in FIGURE 1. The automatic-manual operation switch 38 is a double pole rocker switch which is effective only when the switch 34 is actuated to the teach position and, as the name implies, determines whether the projection of successive transparencies and the reproduction of corresponding audio instructions are to be carried out automatically or under the control of the operator of the device. When the left side of the switch is depressed, the device 10 is placed in the automatic teaching mode of operation and when the right side of the switch is depressed, the device is placed in the manual mode of operation and under the control of the operator. The advance switch 39 is a spring biased pushbutton switch which, as will be explained in detail hereinbelow, is effective only during the teach mode of operation to initiate the projection of a successive transparency and the reproduction of corresponding audio instructions. As shown in FIGURE 4, the answer switches are similarly spring biased pushbutton switches which are effective only during the test mode of operation to initiate the projection of a succeeding transparency and the reproduction of audio information containing a test question relating to the projected transparency.

Mounted in the front wall 12 of the device 10 is a "ready" lamp 44 (FIG. 1) which is illuminated whenever the operator of the device is required to perform a function, such as, for example, depress the advance button 39 during the teaching mode of operation or depress one of the answer buttons 40, 41 or 42 after a question has been posed to the student during the test mode of operation. An "error" lamp 45 is also mounted in the front wall 12 and is illuminated whenever the operator depresses an answer switch which does not correspond to the correct answer to the question concerning the projected transparency. Also mounted in the front wall 12 above the error lamp 45 is an indicator 46 which provides a visual readout of the total number of errors made by the operator during any given test operation.

A loudspeaker 47, mounted in the side wall 20 of the device 10, is coupled to the reproducing electronics within the device. The reproducing electronics of the device may be conventional and, accordingly, need not be explained herein. In addition, a jack 48, which is similarly mounted on the side wall 20 is adapted to receive the plug of a conventional headset (not shown) for use by an individual operator. As is understood, the plug and headset would be employed where a plurality of audio-visual devices are located in the same area and are in operation simultaneously. A-C power signal is supplied to the device 10 through a power cord 50 terminated at one end by a plug 51 which is adapted for insertion into a conventional A-C outlet (not shown). The other end of the cord 50 is coupled to a switch (not shown) within the device which is actuated to a closed position when a cartridge loading lever 84 (to be described hereinafter) is actuated to a locking position.

The recessed front wall portion 13 includes a slot 52 through which an audio-visual cartridge 54, arranged according to the present invention is inserted. To facilitate the proper insertion of the cartridge into the device 10 through the slot 52, the slot 52 comprises graduations or index marks (not shown) formed on opposite sides of the slot for alignment with corresponding index marks formed in the cartridge 54. As best shown in FIGURES 3, 6, 7 and 7A, the cartridge comprises a transparent disc structure, preferably formed of plastic, for retaining a plurality of circumferentially spaced transparencies 56 and for holding captive an independently rotatable grooved record disc 58. In a typical embodiment of the invention, the cartridge 54 includes fifty-two spaced, 35 mm. film segments mounted about its periphery and retains the grooved record disc 58. The disc has an outside diameter of 3¾ inches and includes a grooved portion having an outside diameter of 3¼ inches and an inside diameter of 1¾ inches with a pitch of 650 grooves per inch. Recorded in the grooved portion of the record are 52 segments of audio information, each audio segment corresponding to a selected film segment, and a 75 cps. tone signal interposed between each of the audio segments.

The cartridge 54 is made of two pieces, a first annular base member 59 and a second annular top member 60. The base member 59 has a bore 61 formed centrally therein and a shoulder 62 radially spaced from the center of the base member by a distance slightly greater than the radius of the record disc 58. Interposed between the shoulder 62 and an outer radial shoulder 63 are an annular stepped cutout 64 formed in the upper edge of the base member 59 and an annular cutout 66 formed in the lower half of the base member 59. The transparencies 56 are mounted in the stepped cutout 64. It is noticeable that by forming the cutout 66 in the lower edge of the annular base member 59, the thickness of the plastic member 59 is reduced in the area of the transparencies 56.

The configuration of the annular top member 60 generally complements the configuration of the annular base member 59 such that the top member is frictionally secured within the stepped cutout 64 between the inner and outer radial shoulders 62 and 63 of the base member. It is to be noted, however, that the corresponding cutout formed in the top member 60 is not stepped but rather includes axially thickened inner flanges 67 and 68 (FIG. 3) which abut the opposite upper surfaces of the stepped cutout 64 and the top and bottom edges of the transparencies 56 which are mounted in the stepped cutout 64. In this manner the transparencies are secured within the cartridge 54. The upper top member 60 also includes an inwardly projecting rim portion 69 which extends across the ungrooved outer periphery of the record disc 58 to thereby retain the record disc within the cartridge 54. It should be noticed that because the inner rim portion 69 extends only over the ungrooved outer periphery of the record disc 58, access to the entire grooved portion of the disc is maintained.

As best shown in FIGURES 6, 7, and 7A, the base member 59 includes four equally spaced upright projection members 70 which extend vertically from the stepped cutout 64 into engagement with four corresponding openings 72 formed in the axially thickened inner flange 68 of the annular top member 60. The projection members 70 are located in the stepped cutout 64 such that they engage the first transparency of every group of transparencies to separate the film quadrants of the cartridge 54, as will be apparent hereinbelow. As above mentioned, in a typical embodiment of the invention, the cartridge 54 includes fifty-two circumferentially spaced transparencies which are separated into quadrants, each quadrant containing thirteen transparencies. For this preferred cartridge configuration, the procedure for making a master negative for the cartridge includes the step of photographing thirteen pictures in an arc on 35 mm. motion picture film and repeating this step three additional times for a total of 52 transparencies. Release prints are then made in large quantities, such as, for example, 3000 or 18,000 foot quantities rolls. These rolls are then fitted to a punch which punches out the film quadrants for mounting into the cartridge. The upright projection members 70 are formed in the stepped cutout 64 to make certain that the film quadrants are always aligned when mounted into the cartridge.

Referring to FIGURES 6 and 7, the annular base member 59 further comprises selectively spaced dished cutouts or depressions 74 formed in its lower surface between the central bore 61 and the annular cutout 66. Each transparency 56 is radially aligned with one depression 74, the depressions being selectively aligned in the circumferential direction with one of three radially spaced microswitches 76, 78 and 80 mounted on a platform 82 in the device 10. The microswitches 76, 78 and 80 are electrically coupled between the answer pushbuttons A, B and C, respectively, (FIG. 1) and the error indicating electronics of the device 10 in a manner described hereinafter. As will be explained in detail hereinbelow, when one of the answer switches A, B or C is depressed to answer a test question concerning a projected transparency, current will be supplied to error indicating electronics if the microswitch coupled to the depressed answer button, i.e., A, B or C, does not sense a depression 74. In other words, each depression corresponds to a correct answer and when a microswitch senses that depression, the switch opens the conductive path between the depressed answer button, i.e., A, B or C, and the error indicating electronics.

The lower surface of the annular member further includes a bore 83 formed between the central bore 61 and the annuular cutout 66 for engagement with the cartridge drive mechanism of the instant invention as will be explained hereinbelow. To facilitate proper insertion of the cartridge 54 into the device 10, the cartridge further comprises diametrically opposed index marks formed in the periphery thereof (not shown) for alignment with corresponding graduations formed in opposite sides of the slot 52 of the device 10. As will be explained hereinbelow, because the drive mechanism for the cartridge engages the hole 83 formed in the lower edge of the annular member 59 of the cartridge, alignment of the cartridge in the device is assured.

Figure 2:
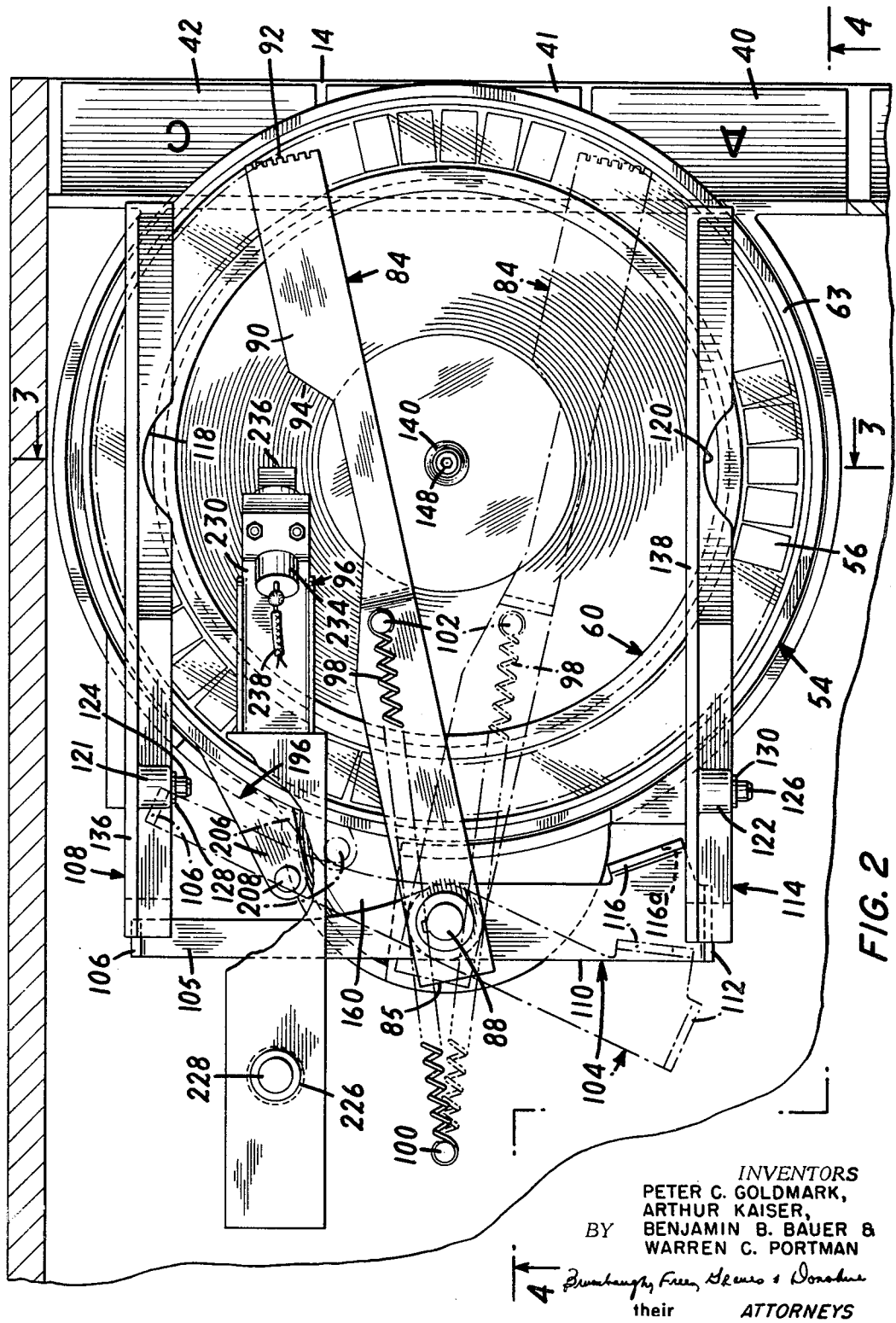
FIGURE 2 is an enlarged fragmentary sectional view of the audio-visual device taken along the line 2—2 of FIGURE 1 and looking in the direction of the arrows.
Figure 3:
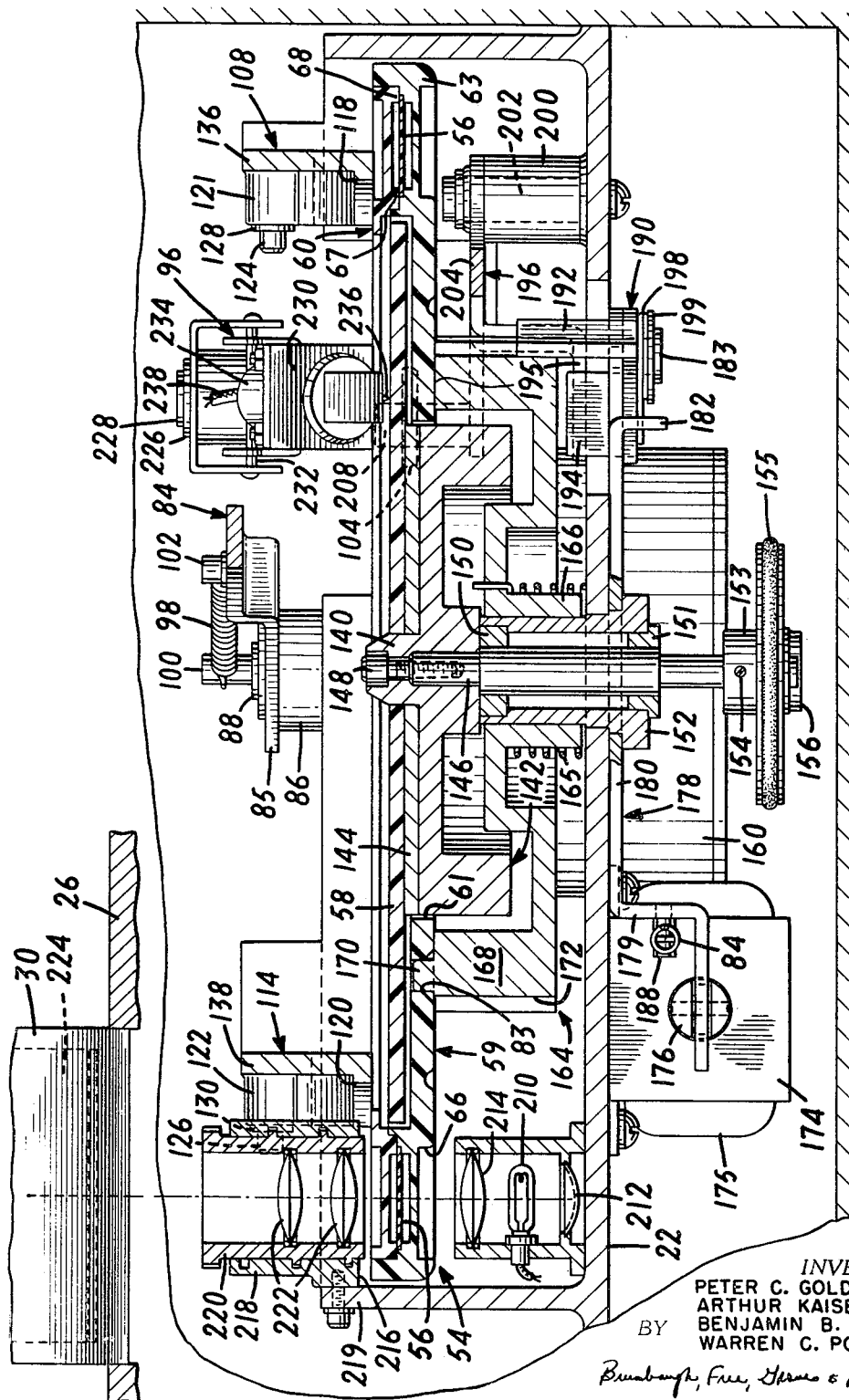
FIGURE 3 is an enlarged cross-sectional view of the audio-visual device taken along the line 3—3 of FIGURE 2.

As best shown in FIGURES 2, 3 and 4, the audio-visual device 10 further comprises a loading lever 84 which includes an inner end portion 85 mounted on a cylindrical housing 86 and keyed to a pivotable splined shaft 88 situated within the housing 86. The generally rectangular upper surface 90 of the lever arm 84 extends diagonally across the cartridge 54 and through the slot 52 formed in the recessed front wall 13 for engagement by the operator of the device 10. To facilitate rotation of the lever arm 84 by the operator, the outer end extending through the slot 52 is formed with serrations 92.

Also formed in the upper surface 90 of the lever arm is a cutout 94 which is provided to prevent the lever arm from interfering with a tone arm 96 as the tone arm moves across the grooved portions of the record disc 58 while reproducing the recorded information therefrom. To load the cartridge 54 into the device 10, the loading lever 84 is rotated by the operator in a clockwise direction as viewed in FIGURE 2 from the locking position shown to a loading position indicated by the phantom lines in that figure. The lever arm 84 is retained in each position by a biasing spring 98 affixed at opposite ends to a stanchion 100 mounted on the support plate 22 (FIG. 4) and a pin member 102 secured in the upper surface 90 of the loading lever. As is understood in the art, the spring 98 is selected such that the lever is retained in either the loading or the locking position and yet only a relatively small force need be exerted to move the lever from either position to the other.

Also mounted on the cylindrical housing 86 and keyed to the splined shaft 88 beneath the loading lever 84 is a release arm 104 which, when the loading lever is retained in the locking position, extends across the device 10 in parallel with the front wall 12. Because the release arm 104 is keyed to the splined shaft 88, it will be rotated by the shaft from the locking position shown to a release position, indicated by the phantom lines, when the loading lever 84 is rotated by the operator from the locking position to the loading position. One end portion 105 (FIG. 2) of the release arm 104 is generally rectangularly shaped and includes an upturned flange 106 for engaging a first cartridge locking arm 108. The other end portion 110 of the release arm 104 is wider than the portion 105 and similarly includes an upturned flange 112 at its extreme end for engaging a second cartridge locking arm 114. Also formed in the end portion 110 is a second upturned flange member 116 which includes a cutout 116a (FIG. 4) which, as will be apparent hereinafter, prevents the flange member from engaging the second cartridge locking arm 114 during the rotation of the arm 104. If desired, the flange member 116 may be utilized to actuate a switch (not shown) such that power is coupled from the power cord 50 through the switch to the sound reproducing electronics, the control electronics and the projection lamp of the device 10 when the upturned flanges 106 and 112 engage the cartridge locking arms 108 and 114, respectively.

As best shown in FIGURES 2 and 4, the locking arms 108 and 114 extend across opposite sides of the cartridge 54 and include cutaway lower edge portions 118 and 120, the opposite ends of the lower edge portions of these two arms engaging the radially thickened inner flange 69 of the annular top member 60 of the cartridge 54. It is noticeable that the cutout 118 is provided so that the locking arm 108 does not interfere with the movement of the tone arm 96 at the outer grooves of the record disc 58. The arms 108 and 114 further comprises bossings 121 and 122, respectively, which are pivotable about a pair of pivot pins 124 and 126 affixed to the frame of the device. A pair of retaining washers 128 and 130 are similarly mounted on the pins 124 and 126 and prevent the bossings 120 and 122 from lateral movement along the pivot pins 124 and 126, respectively. The arms 108 and 114 further include semi-circular end portions 132 and 134 in their bottom surfaces which engage the upright flanges 106 and 112, respectively, of the release arm 104 and longitudinally extending support flanges 136 and 138, respectively.

It can be seen that the locking arms 108 and 114 are freely pivotable when the release arm 104 is rotated by the shaft 88 to the release position indicated by the phantom lines. When the release arm 104 is rotated into the locking position, however, the upturned flanges 106 and 112 bear against the semi-circular end portions 132 and 134 to pivot the locking arms 108 and 114 clockwise (as viewed in FIGURE 4) such that the opposite ends of the cutaway lower edge portions 118 and 120 engage the cartridge 54 and press the cartridge downwardly against a ratchet 164 to be described hereinafter.

In operation, to insert the cartridge 54 into the device 10, the loading lever 84 is rotated clockwise (as viewed in FIGURE 2) to the position indicated by the phantom lines. This results in the angular displacement of the release arm 104 and the locking arms 108 and 114 become freely pivotal. Insertion of the cartridge 54 causes the vertical displacement of the locking arms 108 and 114. After the cartridge 54 is inserted, the loading lever 84 is rotated counterclockwise to the locking position shown and the release arm 104 is rotated and fixed to its locking position to bear against the bearing surfaces 132 and 134 of the locking arms and press the cartridge 54 against the ratchet 164. As will be explained in detail hereinafter, the angular displacement of the release arm 104 also results in the disengagement of the engagement and locking pawls of the cartridge drive mechanism.

As best shown in FIGURE 3, the cartridge 54 is inserted through the slot 52 and into the audio-visual device 10 "by touch" in that the operator moves the cartridge 54 into the device until the central bore in the groove record disc 58 engages the spindle or centering post 140 of a turntable 142 and the cartridge drive mechanism of the device engages the bore 83 formed in the lower edge of the annular member 59. The captive record disc 58 is supported on a cover 144, formed of suitable material, such as, for example, rubber, which is affixed to the turntable 142. Moreover, the disc 58 is raised by the turntable 142 such that the record disc is displaced from the lower annular member 59 of the cartridge 54 to enable thereby frictionless rotation by the record disc. The turntable 142 is affixed to a drive shaft 146 through an Allen head bolt 148 which is threaded into a corresponding internal bore formed in the drive shaft 146.

The shaft 146 includes a large diameter central portion extending through a pair of bushings 150 and 151 internally mounted in opposite ends of a shaft housing 152. The opposite end of the shaft 146 is secured within a corresponding opening formed in a drive pulley 153 by a lock screw 154. As best shown in FIGURE 4, the drive pulley 153 is coupled through a pulley cord 155 to a second, substantially smaller, drive pulley 156 which is mounted on the drive shaft 158 of a motor 160. A plurality of bolts 162 secure the motor 160 to the support plate 22 of the device 10. As will be explained in detail hereinbelow, when the motor 160 is energized, the drive pulley 156 is driven at a constant angular velocity by the drive shaft 158 of the motor 160. Because there is a substantial difference in the diameters of the pulleys 153 and 156, the pulley 153 is driven at a reduced constant angular velocity by the pulley 156 through the cord 155. In turn, the record disc 58 is driven at this reduced constant angular velocity by the shaft 146 affixed to the pulley 153.

In a typical embodiment of the invention, the rotational speed at which the motor drives the shaft 158 and the dimensions of the pulleys 153 and 156 are selected such that the pulley 153 is driven at a constant angular velocity of 22½ r.p.m. For a grooved record disc having an outside diameter of 3¾ inches and a grooved portion with approximately 650 grooves per inch recorded thereon and having an outside diameter of 3¼ inches and an inside diameter of 1¾ inches, there is provided approximately 24 minutes of record playout time.

Figure 5:
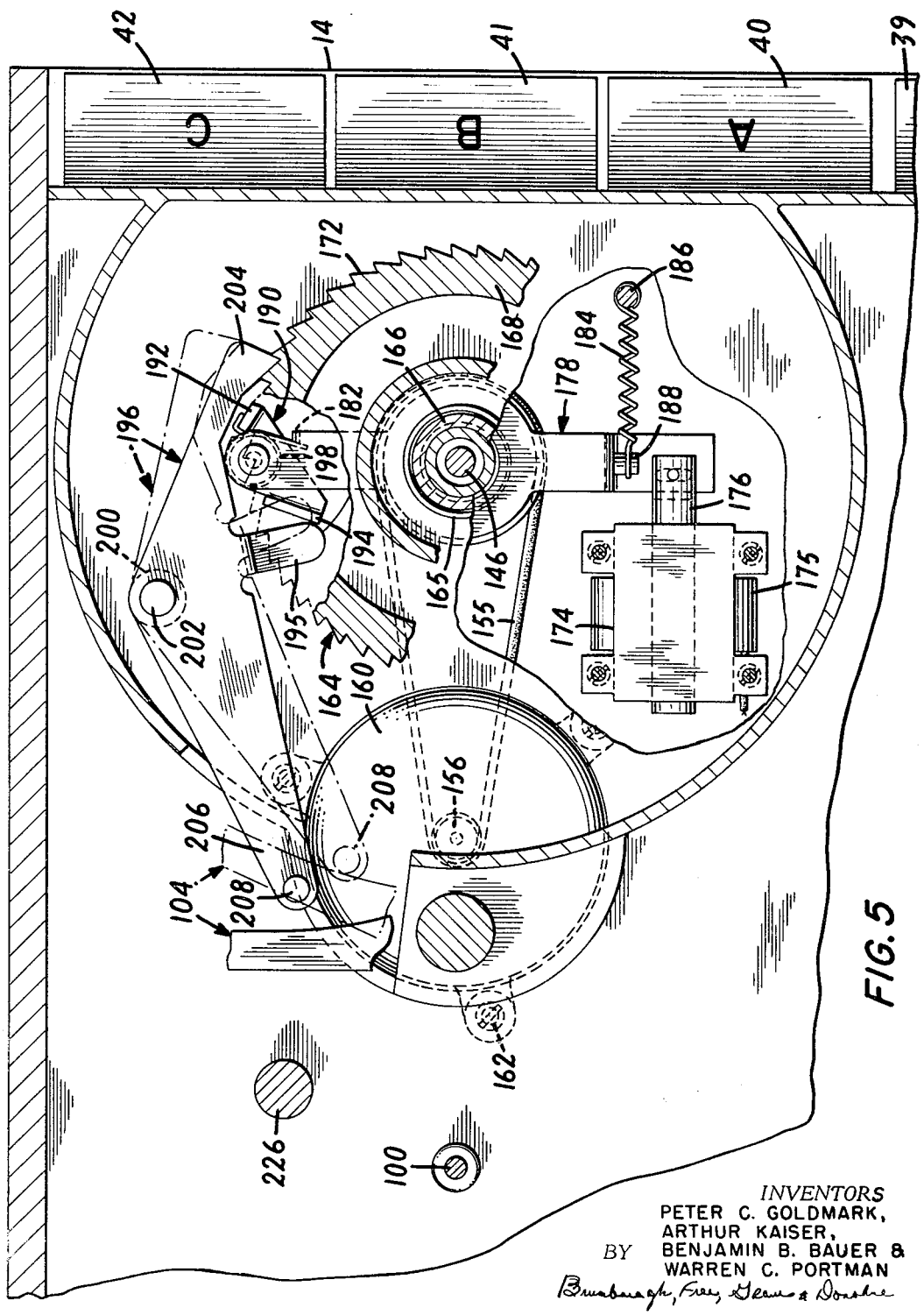
FIGURE 5 is a sectional view of the drive mechanism for the audio-visual device taken along the line 5—5 of FIGURE 4 and looking in the direction of the arrows.

As best shown in FIGURES 3 and 5, the drive mechanism for the cartridge 54 comprises a ratchet 164 which is rotatably mounted on the rive shaft housing 152 above the support base 22. A spring 165 which is wound around the base portion 166 of the ratchet urges the ratchet away from the support base 22. Correspondingly, the upwardly extending radial flange 168 of the ratchet 164 is urged against the bottom surface of the lower annular member 59 of the cartridge 54. Formed in the radial flange 168 is an upstanding alignment pin 170 which, when the cartridge 54 is properly inserted into the device 10, engages the opening 83 in the disc 59. The ratchet 164 further includes a plurality of equally spaced teeth 172 formed in the periphery of its flange portion 168, the number of teeth corresponding to the number of transparencies 56 mounted in the periphery of the cartridge 54. Accordingly, for a cartridge comprising fifty-two transparencies, the ratchet includes fifty-two teeth.

Driving the ratchet 164 is a solenoid 174 which, as will be explained hereinbelow, is intermittently and selectively energized. As best shown in FIGURE 4, the solenoid 174 is bolted to the support plate 22 of the device 10 and includes a coil 175 which, when energized, causes the plunger 176 of the solenoid to retract. Referring again to FIGURES 3 and 5, the plunger 176 is joined to one end of a lever arm 178 which includes a vertical portion 179, a laterally extending portion 180 which is pivotally supported around the drive shaft housing 152, along with a turn down piece 182 and a pivot pin 183 at its other end. A spring 184 is affixed at one end to a pin 186 secured to the frame of the device 10 and is affixed at its other end to a pin 188 secured to the vertical leg 179 of the lever arm 178. As will be apparent hereinbelow, spring 184 operates to return the plunger 176 to its normally expanded position after the intermittent energization of the solenoid 174 and to implement the engagement of a locking lever with an immediately preceding tooth of the ratchet 164.

The turn down piece 182 of the lever arm 178 engages one end of a spring 198 which is wound around the pin 183. An engagement pawl 190 comprises an upturned flange portion 192 shaped for engagement with a tooth 172 of the ratchet and a second upturned flange portion 194 which engages the finger portion 195 of a locking pawl 196, the finger of the locking pawl preventing the manual rotation of the engagement pawl in a clockwise direction as viewed in FIG. 5. A spring 198 is wound around the shaft 183 and affixed at opposite ends to the lever arm 178 and to the upturned flange 192 of the engagement pawl and operates to bias the flange 192 against the tooth of the ratchet with which the flange is engaged. A retaining washer 199 is mounted around the shaft 183 for retaining the engagement pawl in a fixed vertical position.

When the solenoid 174 is energized, the plunger 176 retracts to implement the clockwise rotation of the lever arm 178 around the drive shaft housing 152. In turn, the turn down piece 182 of the lever arm drives, by pin 183 and spring 198 the engagement pawl 190 in a clockwise direction (as viewed in FIGURE 5) and the upturned flange 192 drives the ratchet 164 in the same direction. For a ratchet comprising fifty-two teeth, the action of the engagement pawl 190 causes the ratchet to rotate $\frac{1}{52}$ of a complete revolution. When the solenoid 174 is deenergized, the spring 184 rotates the lever arm 178 in a counterclockwise direction around the shaft housing 152, the upturned flange 192 being disengaged from the tooth which it had driven and slipping into engagement with an immediately preceding tooth of the ratchet. As above mentioned, the spring 198 biases the upturned flange 192 against the tooth of the ratchet with which it is in engagement. As above described, because of the engagement between the cartridge 54 and the ratchet 164 through the alignment pin 170, the incremental rotation of the ratchet causes a corresponding incremental rotation of the cartridge.

In order to prevent the manual rotation of the cartridge 54 by the operator of the device 10, there is further provided a locking pawl 196. Referring to FIGURE 3, the locking pawl 196 is pivotally mounted on a stanchion 200 which is bolted to the base plate 22 and includes a vertically extending pivot pin 202 around which the locking pawl 196 rotates. As previously mentioned, the locking pawl 196 includes the off-center finger portion 195 engaging the upturned second flange 194 of the engagement pawl 190 to prevent thereby the clockwise rotation of the engagement pawl 190 around the pivot pin 183. It is noticeable that the spring 198 urges the engagement pawl 190 to rotate in a clockwise direction. The pawl 196 further comprises one end portion 204 for engagement with a tooth of the ratchet disposed angularly of the tooth in engagement with the upturned flange 192 of the engagement pawl 190 and a freely suspended end portion 206. Affixed to the free end portion 206 is an upwardly extending engagement pin 208 which is engaged by the release arm 104 (FIG. 2) when the release arm 104 is pivoted to a release position by the clockwise rotation of the loading lever 84. With the actuation of the loading lever 84 to a loading position, indicated by the phantom lines, the release arm engages the pin 208 of the locking pawl to implement thereby the counterclockwise rotation of the locking pawl 196 around the pin 202 of the stanchion 200, as viewed in FIG. 5. This causes the end portion 204 to disengage from the ratchet 164 and, because the finger 195 bears against the upturned flange 194 of the engagement pawl, causes the flange 192 of the pawl 190 to also disengage from the ratchet. With the actuation of the loading lever 84 to a lock position, the locking pawl 196 will return to its locking position, both the end portion 204 and the upturned flange 192 engaging corresponding teeth of the ratchet 164. This is true because the spring 199 biases the locking pawl through the engagement between the finger 195 and the upturned flange 194 of the engagement pawl 190.

Manual rotation of the cartridge 54 in a clockwise direction is prevented because of the engagement between the finger portion 195 of the locking pawl and the second flange 194 of the engagement pawl, the finger portion 195 acting as a stop. Similarly, because of the angular engagement between the end portion 204 of the locking pawl 196 and a corresponding tooth of the ratchet 164, manual and automatic rotation of the ratchet 164 in a counter-clockwise direction is prevented.

The optical projection system of the instant audio-visual device may be conventional and, accordingly, need not be described in detail herein. Referring to FIGURE 3, one such conventional system comprises a suitable source of light such as an electric projection bulb or lamp 210, a reflector 212 located beneath the lamp 210 and a condenser lens 214 above the lamp 210 for projecting a beam of light vertically upwardly through a transparency 56, the transparencies being mounted in the periphery of the cartridge 54 such that each transparency will be in alignment with the optical projection axis. A lens barrel mount comprising a base 216 and a socket 218 is secured to a vertical support wall 219 of the device such that the socket 218, which is open at the bottom, is in axial alignment with the transparency 56. A telescopically adjustable lens barrel 220 is mounted in the socket 218 and comprises a pair of projecting lenses 222. Mounted in this wall 26 of the device 10 (FIG. 1) is the fixed mirror cover 30 in which an optical projection mirror 224 is mounted at an angle of 45° to the axis of the lenses 222 to change the direction of the light rays from the perpendicular to the horizontal so that the images are projected onto the screen 28. As stated above, the knurled knob 32 (FIG. 1) is provided to control the focusing of images onto the projection screen 28. Accordingly, the knob 32 is connected to the lens barrel 220 such that rotation of the knob causes corresponding vertical adjustments of the lens barrel 220 within the socket 218.

As best shown in FIGURES 2, 3 and 4, to reproduce the information recorded on the grooved record disc 58, the device 10 comprises the tone arm 96. The tone arm, which may be of conventional construction, is supported at one end on a stanchion 226 which is affixed to the base plate 22 of the device 10. Situated within the stanchion 226 is a pivot pin 228 around which the tone arm 96 is free to rotate. The tone arm includes a support member 230 which is pivotably mounted at the central portion of the tone arm on a pin member 232. Mounted in the support member 230 is a cartridge 234 which includes a V-shaped stylus 236 for responding to the groove modulations of the record disc 58 and for supplying corresponding electrical signals through a cable 238. The cable 238 supplies the electrical signals to the reproducing electronics of the device 10 which may be conventional and need not be explained herein. The cable 238 further supplies the signals to the control electronics of the present invention, as will be explained in detail hereinafter. To insure maximum fidelity and reliability of operation, the stylus 236 is dimensioned such that it engages the record groove at a location at least halfway down the groove during operation. Because the tone arm 96 may be of conventional construction, the control and drive mechanisms for the tone arm which actuate the tone arm need not be described herein. It suffices that when power is coupled to these mechanisms, the tone arm 96 is actuated such that the stylus 236 is placed onto the outermost groove of the record disc 58.

Reference may now be had to FIGURE 8 which depicts the control electronics for the audio-visual teach and test device 10 for a description of the operation thereof. A pair of input terminals 240 receives 115 volt A-C power from the power cord 50 (FIG. 1) through a switch (not shown) when the switch is actuated to a closed position by placement of the locking lever 84 to the locking position (FIG. 2). This power is coupled through a conductor 241 and branch conductors 241a, 241b, 241c and 241d to the engagement arm of a contact 242a associated with a relay 242, to one terminal of the advance switch 39, to the normally closed terminal of a contact 244a associated with a relay 244, and to one contact arm 34a of the teach and test switch 34, respectively. The normally closed terminal of the contact 242a is connected through a conductor 246 to one terminal of the "ready" lamp 44, which may be a neon lamp, and, accordingly, the ready lamp 44 is illuminated at this time.

When the device has been prepared for the manual teaching mode of operation by sliding the button 34 to the "teach" position and depressing the right side of the automatic-manual switch 38 (FIG. 1), operation of the device 10 is initiated by depressing the advance button 39. This couples the 115 volt power through the switch 39, a conductor 248 and through a normally closed contact 250a associated with a relay 250. From the contact 250a, the signal is supplied through a conductor 251 to one "automatic" terminal of the switch 38, one closed "teach" contact of the switch 34 and through a branch conductor 251a to one terminal of the ratchet actuating solenoid 174. From the engagement arm 34b of the teach and test switch 34, the 115 volt power is further connected through a conductor 252 to the first engagement arm of a make-before-break contact 250b, associated with the relay 250, and to the contact arm of a normally open contact 254a associated with a relay 254 through a branch conductor 252a. From the contact 250b, the 115 volt power is supplied to the input terminal of the relay 250, through a conductor 256 to one input terminal of the record disc motor 160 and through a conductor 258 to the normally open terminal of the contact 254a and to the other terminal of the ready lamp 44, thus extinguishing the lamp.

Because the other input terminals of the relay 250 and the motor 160 are connected to the return side of the 115 volt power signal, both the relay and the motor are energized. When the motor 160 is energized, it causes the record disc 58 to rotate a selected angular velocity, such as, for example, 22½ r.p.m., as above described, and the first audio instructional segment recorded on the record is sensed by the stylus 236 of the tone arm, amplified in the reprdoucing electronics and supplied to the loudspeaker 47 (FIG. 1). Energization of the relay 250 causes the actuation of its associated contact 250b such that the first engagement arm opens and the second engagement arm closes to thereby couple the relay 250 to the applied 115 volt input signal through the normally closed contact 242a of the relay 242 and the conductor 241a. Because the contact 250b is of make-before-break type, the second engagement arm couples the 115 volt input signal to the relay 250 before the first arm opens to thereby maintain the relay energized. Energization of the relay 250 further causes its associated contact 250a to open and, accordingly, open the conductive path between the advance pushbutton 39 and the conductor 251, thereby rendering further actuation of the advance pushbutton ineffectual.

The relay 250 further comprises an associated normally closed contact 250c which is coupled across the test terminal associated with the teach and test engagement arm 34a of the switch 34 ad the answer pushbuttons 40, 41 and 42 through two conductors 260. Also included is a normally open contact 250d having its normally open terminal connected between series connected resistor 262 and a capacitor 264 through a conductor 265 and its contact arm connected to a −9 volt signal source, the cathode of a diode 266 and to one input of the relay 254 through a conductor 267, the other input terminal of the relay being connected to the anode of the diode 266 and to the negative side of the capacitor 264. A normally open contact 250e is also provided and has its normally open terminal coupled to the other input terminal of the solenoid 174 through a conductor 268 and its contact 268 and its contact arm coupled to the return side of the 115 volt input through the conductor 269.

Accordingly, energization of the relay 250 causes its associated contact 250c to open, its contact 250d to close to create a conductive path between the conductors 265 and 267 and its contact 250e to close to create a conductive path betwen the conductors 268 and 269. With the closing of the contact 250d, the capacitor 264, which had been positively charged from a +9 volt source through the resistor 262, discharges through the relay 254 to momentarily enrgize the relay. The momentary energization of the relay 254 causes its associated contact 254a to close. Accordingly, the 115 volt input signal is supplied through the contact 254a, the conductor 252 and the conductor 251a to the solenoid 174. Because the other input terminal of the solenoid 174 is connected to return side of the input signal through the contact 250e, the solenoid 174 is momentarily energized. Correspondingly, the plunger 176 is retracted, the upturned flange 192 of the engagement pawl is driven against the tooth of the ratchet 164 with which it is engaged and the cartridge 54 is rotated 1/52 of a complete revolution to bring a succeeding transparency 56 into registration with the optical projection system (FIG. 5). This image contained in the transparency is then projected onto the screen 28.

After a short duration, which may be, for example, 250 milliseconds, the relay 254 is deenergized and, correspondingly, the solenoid 174 is denergized. The motor 160 remains energized, however, and the instructional program material relating to the projected slide is reproduced. It should be understood that, although the motor 160 is energized prior to the energization of the solenoid 174, the overall noticeable effect is one of simultaneous operation. This is true because the disparity in time between the actuation of the motor and the actuation of the solenoid is only a few milliseconds.

As above described, the instructional information recorded on the record disc 58 is supplied from the stylus 236 of the cartridge 234 to the reproducing electronics and then to the loudspeaker 47 or a headset (not shown). The signals derived by the stylus are also supplied to a tone signal separator 270 through the cable 238 which is responsive only to the inaudible tone signal separating the instructional audible segments of information. Signal separator circuits are conventional and need not be explained herein. For example, a reed relay comprising a reed which is tuned to vibrate only upon receipt of the inaudible tone signal, such as, for example, 75 cps., may be employed to segregate the tone signal from the recorded audible information signals.

Accordingly, the record motor 160 remains energized until a tone signal is sensed by the stylus and supplied through the separator 270 to a relay driver 272. In turn, the relay driver 272 supplies a voltage signal to the relay 242 which energizes the relay. Energization of the relay 242 causes the actuation of its associated contact 242a to its normally open position to thereby open the conductive path between the 115 volt input signal and the make-before-break 250b of the relay 250. Because of this break in the conductive path, both the relay 250 and the record disc motor 160 are deenergized. For a record disc providing approximately 24 minutes of playout time and including 52 segments of instructional information, each segment corresponding to a selected transparency, the time duration for the playout of each segment approximates 25 seconds. The neon "ready" lamp 44 will again illuminate to signal the operator of the device to take action. To restart the manual teaching operation, the operator need only depress the advance pushbutton 39. When the button is depressed, the above described sequence of operation is implemented.

The device is prepared for the automatic teaching mode of operation by retaining the teach and test switch in the teach position and depressing the left or automatic side of the switch 38 (FIGURE 1). Actuation of the device is again initiated by the depression of the advance pushbutton 39. At the end of the reproduction of a selected segment of audio instructional information and the projection of a corresponding transparency, the operation of the device does not terminate, as above-described, but rather continues in the following manner. When the tone signal drives the relay 242 into energization through the relay drives 272, the actuation of the normally closed contact 242a to the open position does not interrupt the conductive path between the 115 volt A-C input and the relay 250 and record disc motor 160. Instead, the 115 volt input is supplied through the conductor 241c, the normally closed contact 244a, the first engagement arm 38a of the automatic-manual switch 38 (which is actuated to the automatic position), the conductor 246 and the second engagement arm of the make-before-break contact 250b to the relay 250 and the record disc motor 160. It is noticeable, therefore, that after the initiation of the automatic teaching mode of operation by depression of the advance pushbutton switch 39, the relay 250 and the disc motor 160 will remain energized.

Furthermore, the advance solenoid 174 is momentarily energized each time a tone signal momentarily drives the relay 242 into energization through the relay driver 272. This is true because the contact 250e, which couples the solenoid 174 to the return side of the 115 volt input signal, remains closed and a momentary application of the 115 volt input power is supplied through the contact 242a, a conductor 273, the second engagement arm 38b of the automatic-manual switch 38 and the conductors 251 and 251a to the advance solenoid 174. It is noted that the "ready" lamp 44 is only illuminated at the start of the automatic teaching mode of operation and that it remains extinguished as long as the automatic manual swich 38 is actuated to its automatic position. It is also noticeable that the relay 254 is required only for the manual teaching mode of operation in that its only function is to make certain that the 115 volt power is momentarily supplied to the advance solenoid after the energization of the relay 250 and the record disc motor 160.

In the testing mode of operation, the record disc 58 held captive by the cartridge 54 has recorded thereon segments of test information, each segment corresponding to a selected transparency, and 75 c.p.s. tone signals separating the segments. A question is audibly posed to the operator of the device 10 relative to each projected transparency, the question being answerable by the operator as a three element multiple choice. Accordingly, to prepare the device for the testing operation, the teach and test switch 34 is actuated to the position indicated "test" (FIG. 1). This causes the engagement arms 34a and 34b (FIG. 8) of the teach and test switch 34 to engage the "test" terminals of the switch. As can be seen, this renders both the automatic-manual switch 38 and the advance pushbutton switch 39 ineffectual. However, the "ready" lamp 44 is illuminated because the 115 volt input signal is coupled to one terminal of the lamp through the conductor 241a, the normally closed contact 242a and the conductor 246.

When the switch 34 is actuated to the test position, the 115 volt A-C input is supplied through the conductor 214d and the first engagement arm 34a of the switch 34 to the relay 244 thereby energizing it. Energization of the relay 244 causes its associated contact 244a to open and break the conductive path between the 115 volt input signal and the automatic terminal associated with the first engagement arm 38a of the automatic-manual switch 38. The 115 volt power is further supplied through the conductors 260 and the normally closed contact 250c of the relay 250 to the actuating members 40a, 41a and 42a of the answer pushbuttons 40, 41 and 42. Each of the switches 40, 41 and 42 has associated therewith two contact members 40b, 40c, 41b, 41c and 42b, 42c, respectively, the contact members shaped for engagement with the actuating members 40a, 41a and 42a, respectively, of the switches. The contact members 40b, 41b and 42b are connected together and connected through a conductor 274 to the conductor 252 leading to the first engagement arm of the make-before-break contact 250b and to the engagement arm of the normally open contact 254a of the relay 254. The contact members 40c, 41c and 42c are coupled to the input terminals of the microswitches 76, 78 and 80, respectively, mounted on the platform 82 (FIG. 6). As above described the microswitches 76, 78 and 80 open when sensing a depression formed in the annular member 59 of the cartridge 54. If a depression is not sensed, the switches remain closed and if a depression is sensed, the switches will open. The output terminals of the switches are coupled together and to the error indicator lamp 45 and to an error counter 276, the output of the counter being coupled to the indicator 46 mounted in its front wall of the device 10. The counter 276 may be conventional and, accordingly, need not be explained herein.

As mentioned above, each of the depressions 74 formed in the lower annular member 59 of the cartridge is aligned with one transparency and corresponds to a correct answer However, at the start position of the cartridge, which positioning is assured by engagement of the alignment pin 170 of the ratchet 164 with a corresponding aperture 83 formed in the lower annular member of the cartridge (FIG. 3), the cartridge is provided with three radially spaced cutouts, each cutout being aligned with one of the microswitches 76, 78 and 80, as shown in FIGURE 6. Because of this alignment, each of the microswitches will be open.

Accordingly, with the cartridge 54 properly inserted and locked, the testing operation is initiated by the depression of any one of the three answer switches 40, 41 or 42. This couples the 115 volt signal through the contact arm of the depressed switch, the conductor 252 and the first engagement arm of the make-before-break contact 250b to the relay 250 and the record disc motor 160, thereby energizing these two elements. The operation is then the same as the above described manual teaching mode operation, i.e., the ready lamp 44 is extinguished, the solenoid 174 is energized such that the cartridge 54 is incrementally rotated to an adjacent transparency position, the adjacent transparency is projected onto the screen 28. However, the reproduced information does not explain the projected transparency but rather questions the operator of the device about the projected transparency, which question is presented as a three element multiple choice.

At the end of the reproduced segment of test information, the disc motor 160 and the relay 250 are deenergized with the momentary energization of the relay 242 through the relay driver 272 by the detection of an inaudible tone signal. When the relay 242 deenergizes, the "ready" lamp 44 will again be illuminated. At this time, the operator must answer the question posed to him concerning the projected transparency by depressing one of the answer pushbutton switches. If the student selected the "A" answer switch 40 and this is the correct answer (as shown in FIGURE 8), there is an alignment between the microswitch 76 and the depression formed in the lower annular member 59 of the cartridge corresponding to the correct answer for the projected transparency. Accordingly, a conductive path for the applied 115 volt power will not be created between the depressed switch 40 and the error lamp 45 and the counter 276 and an error indication will not be given. However, the applied 115 volt power is supplied through the conductors 274 and 252 to the first engagement arm of the make-before-break contact 250b. Accordingly, the relay 250 and the motor 160 are energized, the "ready" lamp 44 is extinguished and the cartridge 59 is advanced one position by the solenoid actuated ratchet 164 to start the next test question.

If the operator depresses either or both answer switches 41 and 42 and these switches correspond to incorrect answers (as shown in FIGURE 8), the applied 115 volt power is supplied through either or both the microswitches 78 and 80 to the "error" lamp 45 thereby illuminating the lamp. The counter 276 is also actuated and registers one incorrect answer which is indicated in the front wall 12 of the device by the indicator 46. The applied 115 volt power is also supplied through the conductors 274 and 252 to the first engagement arm of the contact 250b. Accordingly, the relay 250 and the motor 160 are energized, the "ready" lamp 44 is extinguished and the cartridge 59 is advanced one position by the solenoid actuated ratchet 164 to start the next question.

It should be noted that while the motor is energized and rotating the record disc to implement the reproduction of record test information therefrom, the "A," "B" and "C" answer switches 40, 41 and 42, respectively, are rendered ineffectual. This is true because the normally closed contact 250c of the energized relay 250 will be actuated to its open position and the conductive path between the engagement arm 34a of the teach and test switch 34 and the actuating members 40a, 41a and 42a of the answer switches will be broken. A reset switch (not shown) is provided to reset the counter 276 after the playout of one or more test cartridges.

In operation, to insert the cartridge 54 into the device 10, the loading lever 84 is rotated clockwise, as viewed in FIGURE 2, to the position indicated by the phantom lines. This results in the angular displacement of the release arm 104 and the locking arms 108 and 114 become freely pivotal. Also the locking pawl 196 is rotated in a counter-clockwise direction, as viewed in FIGURE 5, and the end portion 204 of the locking pawl and the flange portion 192 of the engagement pawl are disengaged from the ratchet 164. Insertion of the cartridge 54 causes the vertical displacement of the locking arms 108 and 114 (FIG. 2). After the cartridge is inserted, the loading lever 84 is rotated counter-clockwise, as viewed in FIGURE 2, to the locking position, the release arm 104 is correspondingly rotated and fixed to its locking position to urge the locking arms against the cartridge 54 and the locking pawl 196 (FIG. 5) returns to its locking position. Also, the 115 volt input power is coupled to the projection lamp 210, the control electronics (FIG. 8) and to the drive mechanism (not shown) of the tone arm 96.

If the inserted cartridge contains visual and audio information designed to teach the operator of the device 10, the button 34 (FIG. 1) is actuated to the teach position. For manual operation, the right side of the automatic-manual switch 38 is depressed and the advance pushbutton 39 is depressed. This causes the ready lamp 44 to extinguish, momentary power to be supplied to the advance solenoid 174 and sustaining power, to be supplied to the record disc motor 160. At the end of the reproduction of an audio segment corresponding to the projected transparency, an inaudible tone signal is sensed by the stylus 236 of the tone arm, separated by the tone signal separator 270 and supplied to the relay driver 272 to implement the energization of the relay 242 (FIG. 8). This breaks the connection between the 115 volt A-C input and the motor 160 and causes the ready lamp 44 to illuminate. To restart the manual teaching operation and implement the projection of a successive transparency and the reproduction of recorded information related thereto, the operator need only depress the advance button 39.

To implement the automatic teaching mode of operation, the left or automatic side of the switch 38 is depressed and the advance pushbutton switch 39 is depressed. After the reproduction of a selected segment of audio information and the projection of the transparency relating thereto, the operation of the device does not terminate, but rather continues. This is true because the 115 volt A-C input is supplied through the contact 244a and the first engagement arm 38a of the switch 38 to the record disc motor 160 and a momentary 115-volt power signal is supplied to the solenoid 174 through the contact 242a.

If the cartridge 54 carries information designed to test the operator of the device as to the contents of the projected transparencies, the teach and test switch 34 is actuated to the position indicated test (FIG. 1). The testing operation is initiated by depression of any one of the three answer pushbutton switches 40, 41 and 42. This action couples the 115 volt power input through the contact arm of the depressed switch, the conductor 252 and the first engagement arm of the contact 250b to the relay 250 and the record disc motor 160, thereby energizing these two elements. The operation is then the same as the above described manual teaching mode of operation, i.e., the ready lamp 44 is extinguished, the solenoid 174 is energized such that the cartridge 54 is incrementally rotated and an adjacent transparency is projected onto the screen 28.

At the termination of the reproduced segment of test information, the disc motor 160 and the relay 250 are deenergized and the ready lamp 44 is illuminated to notify the operator that he must answer the question posed to him relative to the projected transparency. If the operator depresses an answer switch corresponding to the correct answer, because there is an alignment between the microswitch, i.e., 76, 78 or 80, associated with the depressed answer switch and the depression formed in the annular member 59 of the cartridge, no error indication is given. Moreover, depression of the answer switch causes the 115 volt A-C input to be supplied to the motor 160 and momentarily supplied to the solenoid 174. The ready lamp 44 is extinguished, the record disc 58 is rotated and the cartridge is advanced one position.

If the operator depresses an answer switch corresponding to an incorrect answer, the applied 115 volt power is supplied through the closed microswitch, i.e., 76, 78 or 80, associated with the depressed answer switch to the error indicating electronics. The error lamp 45 illuminates and the counter 276 registers an incorrect answer which is indicated in the front wall 12 of the device 10 by the indicator 46. The 115 volt input is also supplied to the relay 250 and the record disc motor 160 and, accordingly, the ready lamp 44 is extinguished, the cartridge 54 is advanced one position to implement the projection of a successive transparency and the next question is played out.

Although the invention has been described herein with reference to a specific embodiment, many modifications and variations therein will readily occur to those skilled in the art. For example, in another embodiment of the invention, an error relay is situated in parallel with the error indicating lamp 45 and the counter 276 and has an associated normally closed contact which interconnects the conductors 274 and 252. This relay is energized whenever the operator of the device depresses an answer switch corresponding to an incorrect answer, as are the lamp 45 and the counter 276. Energization of this relay causes the actuation of its associated contact to the normally open position to thereby break the connection between the conductors 274 and 252. Accordingly, the relay 250, the record disc motor 160 and the solenoid 174 will remain deenergized and the device does not advance to the next question. If an answer switch corresponding to a correct answer is depressed, the error relay, as well as the lamp 45 and the counter 276, will not be energized and the contact associated with the relay will remain in its normally closed position. Accordingly, the relay 250, the record disc motor 160 and the solenoid 174 will be energized and the succeeding test question will be played out.

In still another embodiment of the invention, in addition to the above described error relay, a reversing record disc motor and associated reverse solenoid are provided to cause the record disc to rotate in a reverse direction at four times the normal speed when an incorrect answer switch is depressed and thereby implement the reproduction of the incorrectly answered test question. Accordingly, all such variations and modifications are included within the intended scope of the invention as defined by the following claims.

What is claimed is:

1. Audio-visual apparatus for projecting spaced visual information segments carried by a holder and for reproducing sound information recorded on a movable storage medium held captive by the holder comprising a housing, retaining means in the housing for receiving the holder, optical projecting means mounted in the housing for projecting the spaced visual information segments carried by the holder, holder drive means mounted in the housing for supporting the holder and for selectively advancing the holder to align thereby successive visual information segments with the optical projecting means, storage medium drive means mounted in the housing for supporting the storage medium and selectively moving the storage medium independently of the holder to enable the reproduction of recorded information therefrom, sound reproducing means mounted in the housing for operative engagement with the storage medium and for reproducing the information recorded thereon when the storage medium is moved by the storage medium drive means, control means responsive to the information reproduced from the storage medium for controlling the actuation of the holder drive means and the storage medium drive means, and locking means mounted in the housing, the locking means including a loading lever manually movable between a locking position and a loading position, and a locking device responsive to the movement of the loading lever to the locking position for bearing against portions of the holder to thereby urge the holder against the holder drive means.

2. Audio-visual apparatus for projecting spaced visual information segments carried by a holder and for reproducing sound information recorded on a movable storage medium held captive by the holder comprising a housing, retaining means in the housing for receiving the holder, optical projecting means mounted in the housing for projecting the space information visual segments carried by the holder, holder drive means mounted in the housing for supporting the holder and for selectively advancing the holder to align thereby successive visual information segments with the optical projecting means, storage medium drive means mounted in the housing for supporting the storage medium and selectively moving the storage medium independently of the holder to enable the reproduction of recorded information therefrom, sound reproducing means mounted in the housing for operative engagement with the storage medium and for reproducing the information recorded thereon when the storage medium is moved by the storage medium drive means, control means responsive to the information reproduced from the storage medium for controlling the actuation of the holder drive means and the storage medium drive means, the holder drive means comprising ratchet means for supporting the holder, and means actuated by the control means for selectively rotating the ratchet means whereby successive visual information segments carried by the holder are aligned with the optical projection means.

3. Apparatus according to claim 1 wherein the holder drive means comprises a first means united with the holder, and second means actuated by the control means for selectively energizing the first means whereby successive visual information segments carried by the holder are aligned with the optical projection means.

4. Apparatus according to claim 3 wherein the housing includes a front wall portion having a slot therein to receive the holder.

5. Apparatus according to claim 4 wherein the holder carries a plurality of circumferentially spaced transparencies and retains a record disc having recorded thereon audible segments of information, each segment corresponding to a selected transparency, and an inaudible tone signal separating each audible segment of information, and wherein the control means comprises first manually operable switch means mounted on the housing and movable between a test position and a teach position for selectively actuating the control means, signal separating means responsive to the information reproduced from the record disc for separating a reproduced inaudible tone signal from the reproduced segments of audible information, means responsive to the separated inaudible tone signal for implementing the deactuation of the storage medium drive means and second manually operable switch means responsive to the movement of the first switch means to the teach position for implementing the momentary actuation of the holder drive means and for implementing the actuation of the storage medium drive means.

6. Apparatus according to claim 3 wherein the storage medium held captive by the holder comprises a grooved record disc having segments of information recorded thereon, each segment corresponding to a selected segment of visual information, and an inaudible tone recording separating each segment of record disc information, and wherein the storage medium drive means comprises a rotatable turntable for supporting the grooved record disc and motor means actuated by the control means for selectively rotating the turntable whereby the record disc is rotated independently of the holder and a segment of information recorded thereon is reproduced by the sound reproducing means.

7. Apparatus according to claim 6 wherein the visual information segments carried by the holder comprise a plurality of circumferentially spaced transparencies, each transparency corresponding to a selected segment of audio information recorded on the grooved record disc.

8. Apparatus according to claim 7 wherein the control means comprises first manually operable switch means for implementing the energization of the motor means and implementing the energization of the second means, signal separating means responsive to the information reproduced from the storage medium for separating a reproduced inaudible tone signal from the reproduced segments of audible information, and means responsive to the separated tone signal for implementing the denergization of the motor means.

9. Apparatus according to claim 8 wherein the control means further comprises second manually operable switch means arranged to implement the continuous energization of the motor means after the first manually operable switch means has implemented the initial energization of the motor means and further arranged to implement the energization of the second means when a tone signal is separated from the segments of audible information by the signal separating means.

10. Apparatus according to claim 7 wherein the first means comprises a ratchet having peripheral tooth portions and the second means includes solenoid means, the solenoid means comprising an engagement pawl for engaging one tooth portion of the ratchet, pivotal lever arm means for supporting the engagement pawl against a tooth portion of the ratchet and a solenoid having a plunger secured to the lever arm and actuated by the control means for selectively pivoting the pivotal lever arm whereby the engagement pawl is driven against the tooth portion of the ratchet with which it is in engagement and the ratchet is incrementally rotated.

11. Apparatus according to claim 10 wherein the locking means further comprises a locking pawl responsive to the movement of the loading lever to the locking position for engaging a tooth portion of the ratchet to preclude the manual rotation of the ratchet in one direction and for engaging the engagement pawl of the solenoid means to preclude the manual rotation of the ratchet in the other direction by precluding the rotation of the engagement pawl in that direction.

12. A device according to claim 5 wherein the control means further comprises third manually operable switch means responsive to the movement of the first switch means to the teach position for implementing the continuous actuation of the storage medium drive means and for implementing the momentary actuation of the holder drive means when a tone signal is separated from the reproduced segments of audible information by the signal separating means.

13. A device according to claim 12 wherein the control means further comprises a plurality of manually operable answer switches responsive to the movement of the first switch means to the test position for implementing the momentary actuation of the holder drive means and for implementing the actuation of the storage drive means.

14. A device according to claim 13 wherein the control means further comprises means responsive to the movement of the first switch means to the teach position for electrically disabling the plurality of manually operable answer switches and means responsive to the movement of the first switch means to the test position for electrically disabling the second and third manually operable switch means.

15. A device according to claim 13 wherein each of the audible segments recorded on the record disc comprises a test question relating to the transparency with which the segment corresponds and which question is answerable by the manual operation of one of the plurality of answer switches, and wherein the control means further comprises error indicating means responsive to the manual operation of at least one answer switch not corresponding to the correct answer for providing a visual indication that a switch corresponding to an incorrect answer has been operated.

16. A device according to claim 15 wherein the error indicating means comprises counter means responsive to the manual operation of answer switches corresponding to incorrect answers for counting the number of times the switches have been operated and for providing a visual indication of the count.

17. A device according to claim 16 wherein the error indicating means comprises means responsive to the manual operation of at least one answer switch not corresponding to the correct answer for maintaining the holder drive means and the storage drive means disabled until an answer switch corresponding to a correct answer is operated.

18. A device according to claim 17 wherein the holder further comprises selectively spaced depressions formed in the bottom surface thereof, each depression being aligned with one of the circumferentially spaced transparencies and corresponding to a correct answer to a recorded test question relating to the transparency with which the depression is aligned.

19. A device according to claim 18 wherein the control means further comprises a plurality of radially spaced switches mounted in the housing, each switch associated with a selected manually operable answer switch and electrically coupled between its associated answer switch and the error indicating electronics, and wherein one of the radially spaced switches engages a depression formed in the bottom surface of the holder each time the transparency aligned with the depression is projected, the switch responsive to the engagement for opening a conductive path between its associated manually operable answer switch and the error indicating means.

20. An audio-visual holder for use with an audio-visual device comprising an annular transparent disc having a central bore formed therein, a movable storage medium having sound information recorded thereon retained within the central bore and spaced visual information segments circumferentially carried by the transparent disc, the spaced visual information segments being mounted in the transparent disc in groups, and wherein the holder further comprises alignment pins adapted for engagement with one visual information segment of each group of transparencies for properly locating the visual information segments in said holder.

21. An audio-visual holder for use with an audio-visual device comprising an annular transparent disc having a central bore formed therein, a movable storage medium having sound information recorded thereon retained within the central bore and spaced visual information segments circumferentially carried by the transparent disc, selectively spaced depressions in the bottom edge of the transparent disc, each depression being aligned with at least one of the circumferentially spaced visual information segments.

22. An audio-visual holder for use with an audio-visual device comprising an annular transparent disc having a central bore formed therein, a movable storage medium having sound information recorded thereon retained within the central bore, spaced visual information segments circumferentially carried by the transparent disc, the storage medium comprising a grooved record disc having recorded thereon segments of sound information corresponding to selected visual information segments and an inaudible tone recording signal separating each segment of sound information, the spaced visual information segments comprising a plurality of circumferentially spaced transparencies, the transparent disc further comprising two vertically spaced apart annular flanges extending partially into the central bore formed therein for supporting and holding captive the grooved record disc, and an annular stepped cutout formed in a peripheral portion of the transparent disc and receiving the plurality of spaced transparencies.

23. An audio-visual holder for use with an audio-visual device comprising an annular transparent disc having a central bore formed therein, a movable storage medium having sound information recorded thereon retained within the central bore, spaced visual information segments circumferentially carried by the transparent disc, the storage medium comprising a grooved record disc having recorded thereon segments of sound information corresponding to selected visual information segments and an inaudible tone recording signal separating each segment of sound information, the spaced visual information segments comprising a plurality of circumferentially spaced transparencies, the transparent disc comprising a first annular base member including an inner flange for supporting the grooved record disc and an annular shoulder radially spaced from the central bore a distance slightly greater than the radius of the record disc, a peripheral shoulder, means forming in the base member between the annular shoulder and the peripheral shoulder, an annular cutout for receiving the plurality of spaced transparencies, and an annular top member shaped for engagement with the base member between the annular and peripheral shoulders thereof, the top member including an inner flange member extending above the perimeter of the grooved record disc to thereby hold captive the record disc.

References Cited

UNITED STATES PATENTS

| | | | |
|---|---|---|---|
| 2,031,605 | 2/1936 | Jenkins et al. | 40—28.3 X |
| 2,683,390 | 7/1954 | Steele. | |
| 2,847,905 | 8/1958 | Novak | 353—18 |
| 2,877,568 | 3/1959 | Besnard et al. | 35—9 |

EUGENE R. CAPOZIO, Primary Examiner

W. H. GRIEB, Assistant Examiner

U.S. Cl. X.R.

353—18, 120